US012467999B2

(12) United States Patent
Chang

(10) Patent No.: US 12,467,999 B2
(45) Date of Patent: Nov. 11, 2025

(54) GEOMETRIC DISTORTION CORRECTION USING LOCAL REGULARIZATION

(71) Applicant: Siemens Healthineers AG, Forchheim (DE)

(72) Inventor: Yulin Chang, Belmont, MA (US)

(73) Assignee: Siemens Healthineers AG, Forchheim (DE)

( * ) Notice: Subject to any disclaimer, the term of this patent is extended or adjusted under 35 U.S.C. 154(b) by 141 days.

(21) Appl. No.: 18/585,738

(22) Filed: Feb. 23, 2024

(65) Prior Publication Data

US 2025/0044391 A1 Feb. 6, 2025

Related U.S. Application Data

(60) Provisional application No. 63/517,429, filed on Aug. 3, 2023.

(51) Int. Cl.
*G01R 33/565* (2006.01)
*G01R 33/56* (2006.01)

(52) U.S. Cl.
CPC ... *G01R 33/56563* (2013.01); *G01R 33/5608* (2013.01)

(58) Field of Classification Search
CPC .............. G01R 33/5608; G01R 33/56563
See application file for complete search history.

(56) References Cited

U.S. PATENT DOCUMENTS

| 10,852,382 | B2 * | 12/2020 | Dannels | G01R 33/56545 |
| 11,215,683 | B2 * | 1/2022 | Feiweier | G06T 7/30 |
| 2022/0057467 | A1 * | 2/2022 | Valvano | G01R 33/56554 |

OTHER PUBLICATIONS

Weisskoff, R. M., and T. L. Davis. "Correcting gross distortion on echo planar images." 11th Ann. Sci. Mtg. Soc. of Magn. Reson. in Med (1992): 4515.
Jezzard, Peter, and Robert S. Balaban. "Correction for geometric distortion in echo planar images from B0 field variations." Magnetic resonance in medicine 34.1 (1995): 65-73.
Munger, Patrice, et al. "An inverse problem approach to the correction of distortion in EPI images." IEEE Transactions on Medical Imaging 19.7 (2000): 681-689.
Andersson, Jesper LR, Stefan Skare, and John Ashburner. "How to correct susceptibility distortions in spin-echo echo-planar images: application to diffusion tensor imaging." Neuroimage 20.2 (2003): 870-888.

(Continued)

*Primary Examiner* — Gregory H Curran

(57) ABSTRACT

Systems and methods include determination of a field map representing inhomogeneity of a main magnetic field of a magnetic resonance scanner within a subject, determination of a pixel shift map based on the field map, operation of the magnetic resonance scanner to generate an image of the subject, determination of a portion of the pixel shift map corresponding to a phase-encoding line of the image, determination of a distortion matrix corresponding to the portion of the pixel shift map, determination of a locally-regularized pseudoinverse distortion matrix based on the distortion matrix, and correction of the line of the image based on the locally-regularized pseudoinverse distortion matrix.

20 Claims, 7 Drawing Sheets

(56) References Cited

OTHER PUBLICATIONS

Weiskopf, Nikolaus, et al. "Single-shot compensation of image distortions and BOLD contrast optimization using multi-echo EPI for real-time fMRI." Neuroimage 24.4 (2005): 1068-1079.
Reber, Paul J., et al. "Correction of off resonance-related distortion in echo-planar imaging using EPI-based field maps." Magnetic Resonance in Medicine 39.2 (1998): 328-330.
Hutton, Chloe, et al. "Image distortion correction in fMRI: a quantitative evaluation." Neuroimage 16.1 (2002): 217-240.
Jenkinson, Mark, et al. "Fsl." Neuroimage 62.2 (2012): 782-790.
https://fsl.fmrib.ox.ac.uk/fsl/fslwiki/FUGUE, Sep. 5, 2012, 12 pages, printed Feb. 16, 2024.
Tikhonov, A. N., Arsenin, V. Y. (1977). Solutions of ill-posed problems. Washington, D.C.: John Wiley & Sons, New York: V. H. Winston & Sons. Abstract only.
Ding, Yu, et al. "Paradoxical effect of the signal-to-noise ratio of GRAPPA calibration lines: A quantitative study." Magnetic resonance in medicine 74.1 (2015): 231-239.
Cusack, Rhodri, Matthew Brett, and Katja Osswald. "An evaluation of the use of magnetic field maps to undistort echo-planar images." Neuroimage 18.1 (2003): 127-142.

\* cited by examiner $$d = \begin{pmatrix} 0.9 \\ 0 \\ -0.2 \end{pmatrix} \overset{300}{}$$

FIG. 3

$$A = \begin{pmatrix} 0.1 & 0 & 0 \\ 0.9 & 1 & 0.2 \\ 0 & 0 & 0.8 \end{pmatrix} \overset{400}{}$$

FIG. 4

$$A^{-1} = \begin{pmatrix} 10 & 0 & 0 \\ -9 & 1 & -0.25 \\ 0 & 0 & 1.25 \end{pmatrix} \overset{500}{}$$

FIG. 5

$$A^+ = (A'A + \lambda^2 I')^{-1} A' = \left( A'A + 0.01 \begin{pmatrix} 1 & 0 & 0 \\ 0 & 1 & 0 \\ 0 & 0 & 1 \end{pmatrix} \right) \overset{600}{} = \begin{pmatrix} 3.57 & 0.318 & -0.08 \\ -3.18 & 0.706 & -0.17 \\ -0.01 & 0.002 & 1.23 \end{pmatrix} \overset{650}{}$$

FIG. 6

$$I' = \begin{pmatrix} 1 & 0 & 0 \\ 0 & 0 & 0 \\ 0 & 0 & 0 \end{pmatrix}\overset{700}{}$$

FIG. 7

$$A^+ = (A'A + \lambda^2 I')^{-1}A' = \left(A'A + 0.01\begin{pmatrix} 1 & 0 & 0 \\ 0 & 0 & 0 \\ 0 & 0 & 0 \end{pmatrix}\overset{700}{}\right) = \begin{pmatrix} 5 & 0 & 0 \\ -4 & 1 & -0.25 \\ 0 & 0 & 1.25 \end{pmatrix}\overset{850}{}$$

FIG. 8

$$d_1 = \begin{pmatrix} 1 \\ 0 \\ -0.2 \end{pmatrix}$$

FIG. 10

$$A_1 = \begin{pmatrix} 0 & 0 & 0 \\ 1 & 1 & 0.2 \\ 0 & 0 & 0.8 \end{pmatrix}$$

FIG. 11

$$A_1^{-1} = \begin{pmatrix} 0 & 0.5 & -0.125 \\ 0 & 0.5 & -0.125 \\ 0 & 0 & 1.25 \end{pmatrix}$$

FIG. 12

GEOMETRIC DISTORTION CORRECTION USING LOCAL REGULARIZATION

CROSS-REFERENCE TO RELATED APPLICATIONS

This application claims priority to, and the benefit of, U.S. Provisional Patent Application Ser. No. 63/517,429, the contents of which are incorporated by reference herein for all purposes.

BACKGROUND

Magnetic Resonance (MR) imaging uses magnetic fields and radio-frequency (RF) pulses to non-invasively image organs, tissues, and physiological processes of a body. MR imaging does not subject tissues to ionizing radiation and can therefore be conducted regularly to monitor disease progression and/or treatment response. An MR scanner acquires k-space data of patient anatomy by delivering RF pulses and encoding gradients thereto according to a specified pulse sequence. The k-space data is then reconstructed into a three-dimensional image using a Fourier Transform.

Echo-planar imaging (EPI) is widely used due to its ability to provide fast MR imaging. However, due to its data acquisition strategy, images produced using EPI often suffer from several types of artifacts, including geometric distortion. This geometric distortion results from inhomogeneity in the main magnet (i.e., $B_0$) magnetic field and EPI's relatively-low bandwidth in the phase-encoding (PE) direction.

The inverse method has been used to address geometric distortion in EPI images. According to the inverse method, x is the image without distortion, b is the distorted image that is acquired, and A is the distortion operation ("distortion matrix") that transforms x into b. The distortion can be expressed as a forward linear operation Ax=b and the non-distorted image x can be obtained by multiplying b by the inverse of distortion matrix A. This method is highly sensitive to any noise in the data, and, as a result, the resulting image x often suffers from noise "hot spots".

Systems are desired for efficiently correcting geometric distortion within EPI images.

BRIEF DESCRIPTION OF THE DRAWINGS

FIG. 3 illustrates a pixel shift map according to some embodiments.

FIG. 4 illustrates a distortion matrix according to some embodiments.

FIG. 5 illustrates an inverse distortion matrix.

FIG. 6 illustrates determination of a pseudoinverse distortion matrix.

FIG. 7 illustrates a local identity matrix according to some embodiments.

FIG. 8 illustrates determination of a pseudoinverse distortion matrix according to some embodiments.

FIG. 10 illustrates a modified pixel shift map according to some embodiments.

FIG. 11 illustrates a rank-deficient distortion matrix according to some embodiments.

FIG. 12 illustrates a pseudoinverse distortion matrix according to some embodiments.

DETAILED DESCRIPTION

The following description is provided to enable any person in the art to make and use the described embodiments. Various modifications, however, will remain readily apparent to those in the art.

The present inventor has discovered that, though the inverse method can be ill-conditioned and highly sensitive to noise, the resulting negative effects are mostly confined to specific portions of a thusly-corrected image. Embodiments therefore address these noise hot spots while using the inverse method to faithfully correct the remaining portions of the image. In particular, embodiments may determine a locally-regularized version of the inverse distortion matrix (i.e., a pseudoinverse distortion matrix) and use the pseudoinverse distortion matrix to generate distortion-corrected image x.

Embodiments may advantageously leverage $B_0$ field maps which are routinely measured prior to most MR scans. Moreover, since geometric distortion occurs in the complex image domain, some embodiments advantageously operate directly on complex image data before determination of a magnitude image.

Figure 1:
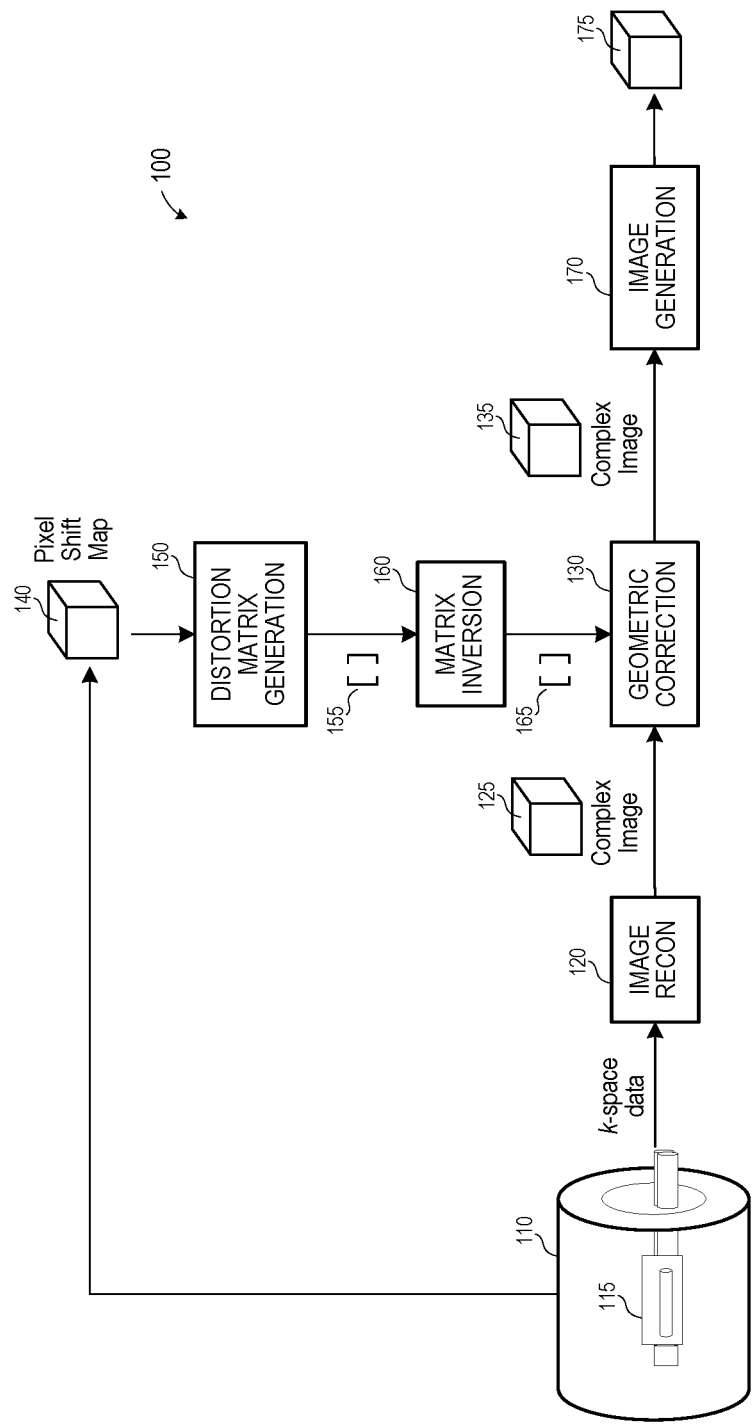
FIG. 1 illustrates an architecture for correcting geometric distortion within an EPI image according to some embodiments.

FIG. 1 illustrates architecture 100 for correcting geometric distortion within an EPI image according to some embodiments. MR scanner 110 may comprise any suitable MR scanner that is or becomes known. As is known in the art, MR scanner 110 executes a pulse sequence to acquire complex MR signals (i.e., k-space data) from subject 115. Generally, a pulse sequence is a preselected set of defined RF and gradient pulses, where execution of the set results in acquisition of one or more lines of k-space data. According to some embodiments, scanner 110 executes an EPI pulse sequence to acquire k-space data.

An EPI pulse sequence includes an excitation pulse, possibly preceded by magnetization preparation, continuous signal acquisition in the form of a gradient echo train, to acquire total or partial k-space (i.e., a single shot or segmented acquisition), and readout and phase-encoding gradients adapted to spatial image encoding, with several possible trajectories to fill k-space. Contrast in EPI sequences is determined by excitation pulse and possible magnetization preparation.

Image reconstruction component 120 applies a suitable image reconstruction algorithm to the k-space data to generate complex image 125, in which voxels are represented by complex numbers as is known in the art. Image reconstruction may include motion correction or other steps that are or become known. Complex image 125 may include geometric distortions due to $B_0$ field inhomogeneities as described above. Geometric correction component 130 applies a correction to complex image 125 to account for such $B_0$ field inhomogeneities. The correction is based on $B_0$ field inhomogeneities reflected in pixel shift map 140.

Pixel shift map 140 indicates the magnitude and direction of intensity shifts among voxels of an image due to inhomogeneity of the static main magnetic field (i.e., $B_0$) of scanner 110. Pixel shift map 140 may be determined based on a field map as is known in the art. Generally, a field map represents the distribution of $B_0$. To generate a field map, in one example, MR scanner 110 executes two gradient-echo non-EPI sequences which differ only in echo time. A phase difference image is generated based on the differences between the two acquired phase images. The phase difference image indicates the inhomogeneity of the magnetic field at each voxel. The phase difference image may be masked by one of the acquired magnitude images to eliminate noise outside the imaged volume of subject 115.

The phases of the phase difference image are wrapped into the range $[-\pi, +\pi]$. Therefore, to obtain a measure of the underlying magnetic field, an unwrapping algorithm is applied to replace missing multiples of 2. Spline fitting may then be performed to fit the unwrapped image to several polynomial functions, which are used to extrapolate the unwrapped image into the areas outside of the imaged volume. The extrapolated image is then smoothed and masked, for example using a dilated and smoothed signal intensity mask to create a final field map. This field map is converted to pixel shift map 140 as is known in the art. Embodiments may implement any processes for generating pixel shift map 140 based on field $B_0$ inhomogeneities that are or become known.

Distortion matrix generation component 150 generates distortion matrix 165 based on pixel shift map 140. According to some embodiments, component 150 generates distortion matrix 165 as is known in the art. Alternatively, in some embodiments which will be described below, component 150 generates distortion matrix 165 as a rank-deficient distortion matrix.

Matrix inversion component 160 generates pseudoinverse distortion matrix 165 based on distortion matrix 155. Advantageously, pseudoinverse distortion matrix 165 is locally-regularized and provides improved geometric distortion correction with respect to traditional inverse distortion matrices. As will be described below, pseudoinverse distortion matrix 165 may be generated using a modified Tikhonov regularization technique. In other embodiments in which matrix 155 is rank-deficient, pseudoinverse distortion matrix 165 may be a Moore-Penrose pseudoinverse of matrix 155.

Geometric correction component 130 multiplies complex image 120 by pseudoinverse distortion matrix 165 to generate corrected complex image 135. Image generation component 170 may generate magnitude image 175 based on complex image 135 using any known processes. Magnitude image 175 may be displayed and may present artifacts which are less prominent than those which would have been presented using previous approaches.

Figure 2:
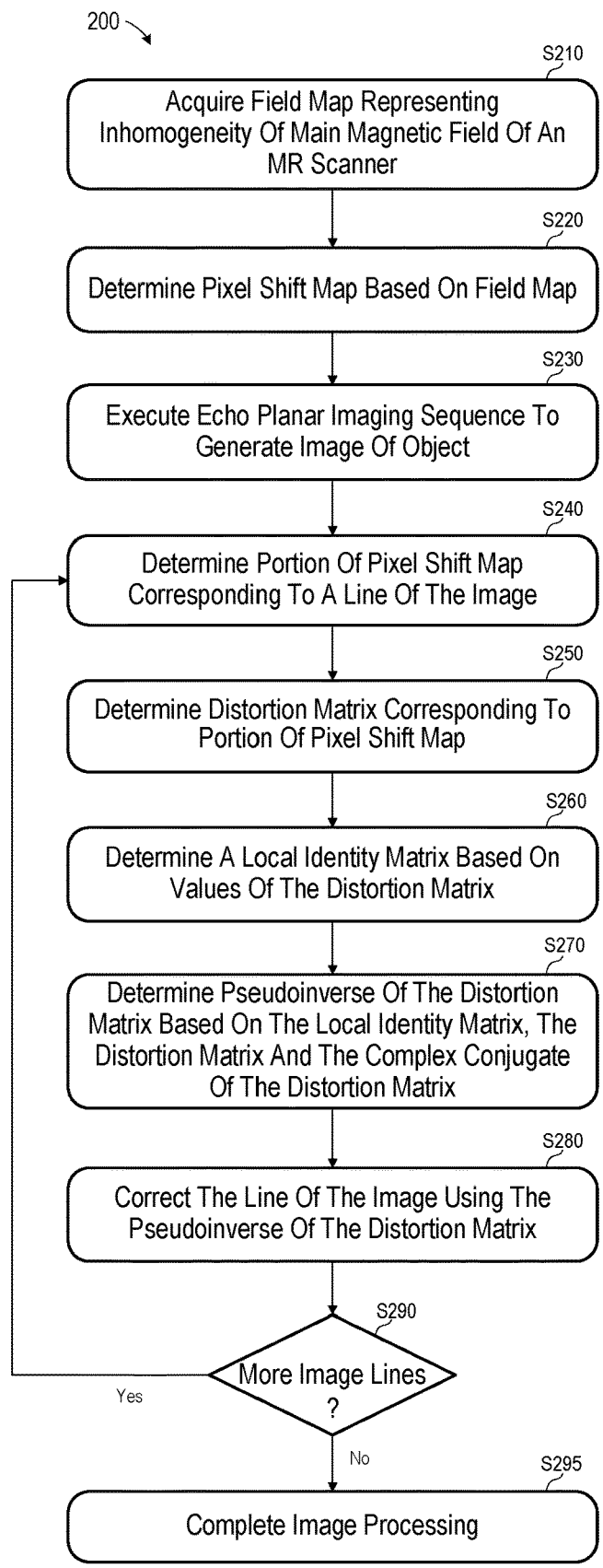
FIG. 2 comprises a flow diagram of a process to correct geometric distortion within an EPI image according to some embodiments.

FIG. 2 comprises a flow diagram of process 200 to correct geometric distortion within an EPI image according to some embodiments. Process 200 may be executed by various components of architecture 100, but embodiments are not limited thereto. In some embodiments, various hardware elements (e.g., one or more processing units) execute program code to perform process 200. The steps of process 200 need not be performed by a single device or system, nor temporally adjacent to one another.

Process 200 and all other processes mentioned herein may be embodied in program code read from one or more of non-transitory computer-readable media, such as a disk-based or solid-state hard drive, a DVD-ROM, a Flash drive, and a magnetic tape, and executed by one or more processing units (e.g., processors, processor cores, processor threads). In some embodiments, hard-wired circuitry may be used in place of, or in combination with, program code for implementation of processes according to some embodiments. Embodiments are therefore not limited to any specific combination of hardware and software.

A $B_0$ field map is acquired at S210. The field map represents the inhomogeneity of a main magnetic field of an MR scanner. The field map may represent the distribution of $B_0$ within a volume to be imaged. Accordingly, the field map is acquired while a patient to be imaged using an EPI sequence resides in the bore of the MR scanner. A position of the patient and the field of view of the field map are preferably similar to those during the subsequent EPI sequence in order to registration between the distribution representation and a reconstructed EPI image.

A pixel shift map is determined based on the field map at S220. As described above, the field map may undergo several processing steps prior to determination of the pixel shift map therefrom. The processing steps may include but are not limited to unwrapping, de-spiking, spline-fitting, smoothing, and masking. Embodiments may implement any processes for generating a pixel shift map based on field $B_0$ inhomogeneities that are or become known.

FIG. 3 illustrates one-dimensional pixel shift map 300 of a three-pixel image according to some embodiments. Pixel shift map 300 indicates the magnitude and direction of intensity shifts among the pixels due to inhomogeneity of the static main magnetic field (i.e., $B_0$). In particular, pixel shift map 300 indicates that the inhomogeneities cause 90% of the intensity of the first pixel to shift to the second pixel and cause 20% of the intensity of the third pixel to shift to the second pixel. All of the intensity of the second pixel remains at the second pixel. Embodiments are not limited to one-dimensional pixels shift maps.

An EPI pulse sequence is executed at S230 to generate an image of an object. According to some embodiments of S230, the EPI pulse sequence results in acquisition of k-space data. The k-space data is reconstructed into a complex image including magnitude and phase components. The complex image may include geometric distortions due to $B_0$ field inhomogeneities.

A portion of the pixel shift map corresponding to a line of the image is determined at S240. The line of the image may be oriented in the phase-encoding direction, i.e., having a constant frequency encoding value because geometric distortion in the presence of $B_0$ field inhomogeneity primarily occurs in the phase-encoding direction. For purposes of the present example, it will be assumed that pixel shift map 300 corresponding to a line of the image which is oriented in the phase-encoding direction.

A distortion matrix corresponding to the portion of the pixel shift map is determined at S250. FIG. 4 illustrates distortion matrix 400 determined based on pixel shift map 300 according to some embodiments. The first column of distortion matrix 400 represents the distribution of intensities of the first pixel as represented by pixel shift map 300, the second column represents the distribution of intensities of the second pixel, and the third column represents the distribution of intensities of the third pixel. Generation of a distortion matrix corresponding to a portion of a pixel shift map may proceed according to any algorithm known in the art.

As noted above, given acquired image b, distortion matrix A and non-distorted image $x=Ab$, x may be obtained by the operation $A^{-1}b$. Matrix 500 of FIG. 5 is the inverse of distortion matrix 400. Assuming A=distortion matrix 400 and $A^{-1}$=inverse distortion matrix 500, and due to the values of inverse distortion matrix 500, applying the inverse operation $A^{-1}b$ to the acquired EPI image would amplify the noise in the first pixel of the distorted image by 10× and amplify the noise in the second pixel of the distorted image by 9×.

To address the foregoing effects of a high-conditioned distortion matrix such as matrix 500, prior systems have utilized the Tikhonov regularization technique, which substitutes a regularized pseudoinverse $A^+$ of the distortion matrix for the actual inverse $A^{-1}$ of the distortion matrix. Non-distorted image x is therefore calculated as $x \approx A^+b$.

According to Tikhonov regularization, $A^+=(A'A+\lambda^2 I)^{-1} A'$, where A' is the complex conjugate of A, I is the identity matrix and $\lambda$ adjusts the magnitude. FIG. 6 illustrates determination of $A^+$ according to the present example, in which matrix 600 is the identity matrix and $\lambda=0.1$. Due to the existence of values 3.57 and −3.18 in place of values 10 and −9 of inverse distortion matrix 500, distortion correction using pseudoinverse matrix 650 would reduce the noise amplification in comparison to using inverse distortion matrix 500. However, application of pseudoinverse matrix 650 would cause more overall shifting and reduced overall pixel magnitude.

Embodiments modify the above-described Tikhonov regularization by using a local identity matrix I' instead of global identity matrix I. The local identity matrix is determined at S260 based on the values of the distortion matrix determined at S250. For example, the diagonal of the local identity matrix may be populated with 1 only within columns which are associated with large values in the distortion matrix, and with 0 within other columns. FIG. 7 illustrates local identity matrix 700 according to some embodiments. The diagonal of matrix 700 is populated with 1 only in the first column, which corresponds to the first column of distortion matrix 400 (including value 0.9) and to the first pixel.

A pseudoinverse of the distortion matrix is determined at S270 based on the local identity matrix, the distortion matrix and the complex conjugate of the distortion matrix. Some embodiments substitute I' for/in the Tikhonov regularization formula, i.e., $A^+=(A'A+\lambda^2 I')^{-1} A'$. FIG. 8 illustrates such a determination, using local identity matrix 700 of FIG. 7 to calculate $A^+$=pseudoinverse distortion matrix 850. As shown, the large values of the first column of inverse distortion matrix 500 are reduced by approximately one-half, which mitigates the above-described noise enhancement problem of inverse distortion matrix 500. Unlike the case of conventional Tikhonov regularization, the third row of pseudoinverse distortion matrix 850 is the same as the third row of inverse distortion matrix 500. Consequently, the effects of the regularization are limited to the correction of the first and second pixels, while the correction of the third pixel is identical to the ideal case of $A^{-1}$=inverse distortion matrix 500.

At S280, the current line of the image is corrected using the pseudoinverse of the distortion matrix determined at S270. Assuming the current line is b, S280 may consist of obtaining the product $A^+b$, where $A^+$ is the pseudoinverse of the distortion matrix determined at S270. It is then determined at S290 whether any lines of the image remain to be corrected. If so, flow returns to S240 to determine a portion of the pixel shift map which corresponds to a next line of the image and to correct the next line as described above. Again, the next line may be oriented in the phase-encoding direction.

Flow proceeds from S290 to S295 once all lines of the EPI image have been corrected, resulting in a corrected EPI image. Additional image processing may be performed at S295 prior to display of the image. For example, the corrected EPI image may be converted to a magnitude image. Additional image smoothing may also be applied at S295.

Figure 9:
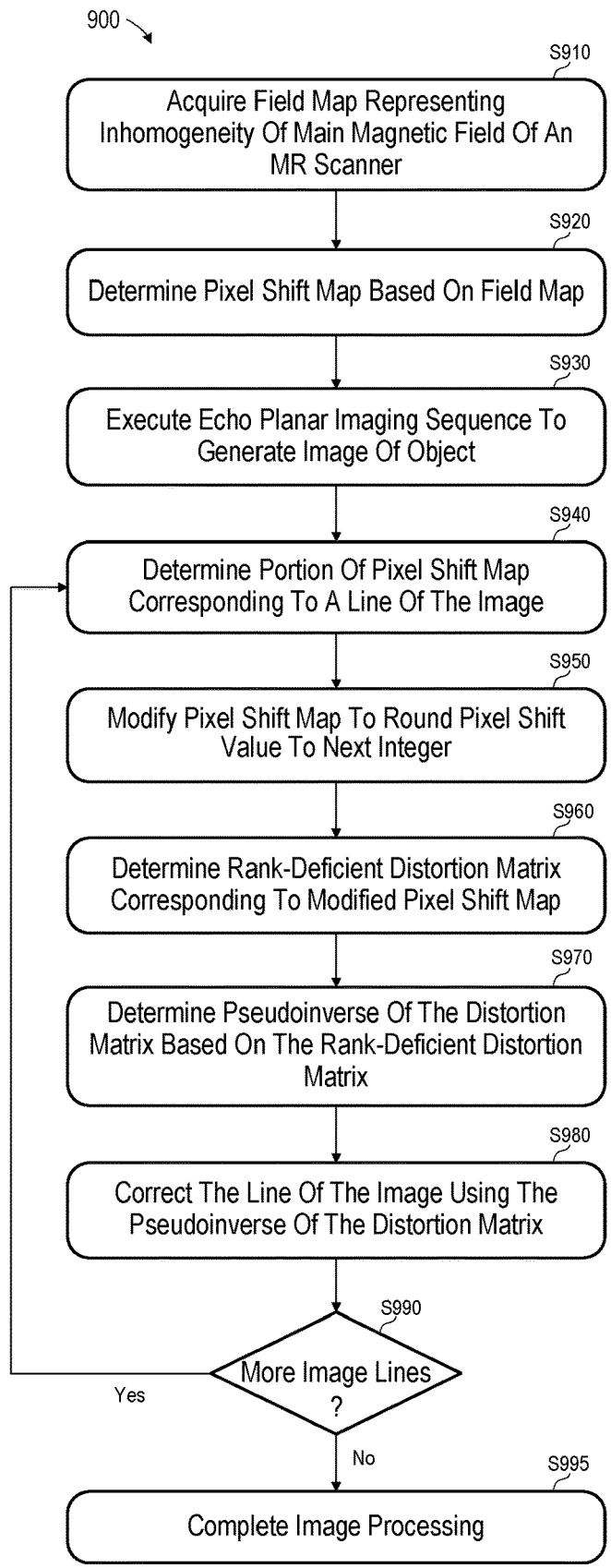
FIG. 9 comprises a flow diagram of a process to correct geometric distortion within an EPI image according to some embodiments.

FIG. 9 comprises a flow diagram of process 900 to correct geometric distortion within an EPI image according to some embodiments. Generally, process 900 generates a locally-regularized pseudoinverse distortion matrix in a different manner than that described with respect to process 200.

S910 through S940 may proceed as described above with respect to S210 through S240 of process 200. At S950, the portion of the pixel shift map corresponding to the current image line is modified. In some embodiments of S950, at least one pixel shift value of the portion of the pixel shift map is rounded to a next integer. It will be assumed that pixel shift map 300 is determined at S940. The value 0.9 of pixel shift map 300 may be rounded to a value of 1 at S950, resulting in modified pixel shift map 1000 of FIG. 10. According to some embodiments, all values of a pixel shift map above a certain absolute value threshold (e.g., 0.7) are rounded to 1 or −1 (whichever is closest).

In some embodiments of S950, local minima and maxima are identified in the portion of the pixel shift map. If an identified value is sufficiently close to a non-zero integer, it is replaced by that integer. For example, a local maximum pixel shift value of 1.95 would be replaced by 2, and a local minimum pixel shift value of −1.92 would be replaced by −2. Since the field map is normally smooth, often less than three pixel shift values for each line of the pixel shift map are replaced.

A distortion matrix corresponding to the modified pixel shift map is then determined at S960. The distortion matrix is determined using any known processes. FIG. 11 illustrates distortion matrix 1100 determined based on modified pixel shift map 1000 of FIG. 10 according to some embodiments. The modification of the pixel shift map to include additional integer values renders the distortion matrix rank deficient and therefore un-invertible. In the present example, the second pixel of the distorted image would be the sum of the first and second pixels of the original image and there is no suitable way of separating the pixels.

Since the distortion matrix is rank deficient and un-invertible, a pseudoinverse of the distortion matrix is determined at S970. According to some embodiments, the pseudoinverse is the Moore-Penrose pseudoinverse of the distortion matrix. For example, FIG. 12 illustrates Moore-Penrose pseudoinverse distortion matrix 1200 which was determined based on distortion matrix 1100 according to some embodiments. The current line of the image is corrected using the determined pseudoinverse distortion matrix at S980.

Since the first and second pixels cannot be suitably separated as noted above pseudoinverse distortion matrix 1200 includes a best-guess of values by evenly dividing the second pixel of the distorted image into the first and second pixels of the corrected image (i.e., ignoring the contribution from the third pixel for the time being), thereby blurring the part of the image consisting of the first and second pixels. In contrast to inverse distortion matrix 500, matrix 1200 does not include large values and avoids undue noise enhancement. Moreover, in view of the identical third rows of matrix 500 and matrix 1200, the blurring is confined locally and the recovery of the third pixel is unchanged.

Flow then cycles between S940 and S990 until all lines of the image have been corrected. Additional image processing of the image may be completed at S995 as described above, and prior to display and analysis.

In some embodiments, S240 of process 200 includes modification of a portion of the pixel shift map as described with respect to S950. Subsequent steps S250 through S280 are then performed based on the modified portion of the pixel shift map. It may be preferable in such an implementation to limit the number of 1s in the local identity matrix (i.e., the distortion matrix values to be regularized) to ten or less, in order to limit the regularization effect beyond what may be necessary.

Some embodiments may be employed to correct geometric distortion within a multi-channel EPI image according to some embodiments. In this regard, the bore of an MR scanner may include any number of coils disposed in any arrangement with respect to an object to be imaged. Each of such RF coils transmits RF signals to the object according to a specified pulse sequence and receives RF signals therefrom. The RF signals received by a coil are converted to k-space data, such that a separate set of k-space data is determined for each coil. Each set of k-space data is considered a "channel" and the sets taken together are referred to as multi-channel k-space data.

If all channels of k-space data can be properly combined with proper phase into a single complex image, process 200 or process 900 may be applied to the single complex image. According to some embodiments, process 200 or process 900 is executed independently for each RF coil. That is, an EPI image and a field map are generated for a given coil based on k-space data acquired by the given coil, a pseudoinverse distortion matrix is determined for the given coil, and a corrected EPI image is generated based on the pseudoinverse distortion matrix. All of the corrected EPI images, i.e., one per coil, may then be summed or otherwise combined to generate a final corrected EPI image.

Figure 13:
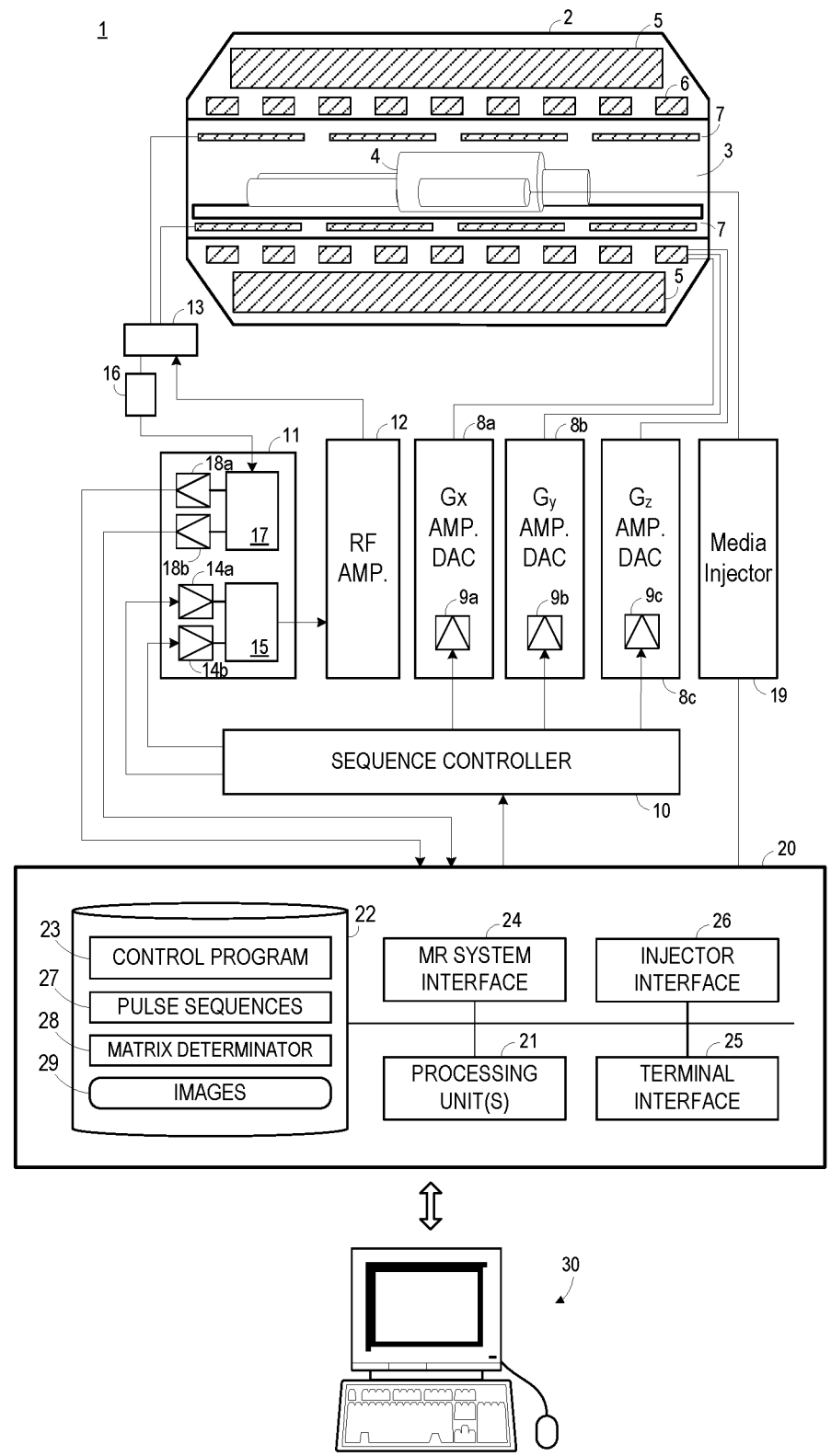
FIG. 13 is a block diagram of an MR imaging system according to some embodiments.

FIG. 13 illustrates MR system 1 for executing pulse sequences to acquire k-space data and reconstructing images therefrom according to some embodiments. Embodiments are not limited to MR system 1.

MR system 1 includes MR chassis 2, which defines bore 3 in which patient 4 is disposed. MR chassis 2 includes polarizing main magnet 5, gradient coils 6 and RF coils 7 arranged about bore 3. According to some embodiments, polarizing main magnet 5 generates a uniform main magnetic field (i.e., $B_0$) and RF coils 7 emit an excitation field (i.e., $B_1$).

According to MR techniques, a volume of material (e.g., human tissue) is subjected to a main polarizing magnetic field (i.e., $B_0$), causing the individual magnetic moments of the nuclear spins in the substance to process about the polarizing field in random order at their characteristic Larmor frequency, in an attempt to align with the field. A net magnetic moment $M_z$ is produced in the direction of the polarizing field, and the randomly oriented magnetic components in the perpendicular plane (the x-y plane) cancel out one another.

The material is then subjected to an excitation field (i.e., $B_1$) created by emission of a radiofrequency (RF) pulse, which is in the x-y plane and near the Larmor frequency, causing the net aligned magnetic moment $M_z$ to rotate into the x-y plane so as to produce a net transverse magnetic moment $M_t$, which is rotating, or spinning, in the x-y plane at the Larmor frequency. The excitation field is terminated, and signals are emitted by the excited spins as they return to their pre-excitation field state. The emitted signals are detected, digitized and processed to reconstruct an image using one of many well-known MR reconstruction techniques.

Gradient coils 6 produce magnetic field gradients $G_x$, $G_y$, and $G_z$ which are used for position-encoding MR signals. The magnetic field gradients $G_x$, $G_y$, and $G_z$ distort the main magnetic field in a predictable way so that the Larmor frequency of nuclei within the main magnetic field varies as a function of position. Accordingly, an excitation field $B_1$ which is near a particular Larmor frequency will tip the net aligned moment $M_z$ of those nuclei located at field positions which correspond to the particular Larmor frequency, and signals will be emitted only by those nuclei after the excitation field $B_1$ is terminated.

Gradient coils 6 may consist of three windings, for example, each of which is supplied with current by an amplifier 8a-8c in order to generate a linear gradient field in its respective Cartesian direction (i.e., x, y, or z). Each amplifier 8a-8c includes a digital-analog converter 9a-9c which is controlled by a sequence controller 10 to generate desired gradient pulses at proper times.

Sequence controller 10 also controls the generation of RF pulses by RF system 11 and RF power amplifier 12. RF system 11 and RF power amplifier 12 are responsive to a scan prescription and direction from sequence controller 10 to produce RF pulses of the desired frequency, phase, and pulse amplitude waveform. The generated RF pulses may be applied to each of RF coils 7. RF coils 7 convert the RF pulses emitted by RF power amplifier 12, via multiplexer 13, into a magnetic alternating field in order to excite the nuclei and align the nuclear spins of the object to be examined or the region of the object to be examined. RF pulses may be emitted in a magnetization preparation step in order to enhance or suppress certain signals.

The RF pulses are represented digitally as complex numbers. Sequence controller 10 supplies these numbers in real and imaginary parts to digital-analog converters 14a-14b in RF system 11 to create corresponding analog pulse sequences. Transmission channel 15 modulates the pulse sequences with a radio-frequency carrier signal having a base frequency corresponding to the resonance frequency of the nuclear spins in the volume to be imaged.

RF coils 7 both emit radio-frequency pulses as described above and scan the alternating field which is produced as a result of processing nuclear spins, i.e. the nuclear spin echo signals. The received signals are received by multiplexer 13, amplified by RF amplifier 16 and demodulated in receiving channel 17 of RF system 11 in a phase-sensitive manner. Analog-digital converters 18a and 18b convert the demodulated signals into real and imaginary components.

Computing system 20 receives the real and imaginary components from analog-digital converters 18a and 18b and may process the components according to known techniques. Such processing may, for example, combining the multi-channel k-space data, suppressing signals using a coil-mixing matrix as described herein, reconstructing two-dimensional or three-dimensional images by performing a Fourier transformation of k-space data, performing other image reconstruction techniques such as iterative or back-projection reconstruction techniques, applying filters to raw k-space data or to reconstructed images, generating functional magnetic resonance images, calculating motion or flow images, and generating a chemical shift vs. magnitude spectrum.

System 20 may comprise any general-purpose or dedicated computing system. Accordingly, system 20 includes one or more processing units 21 (e.g., processors, processor cores, execution threads, etc.) configured to execute processor-executable program code to cause system 20 to operate as described herein, and storage device 22 for storing the program code. Storage device 22 may comprise one or more fixed disks, solid-state random-access memory, and/or removable media (e.g., a thumb drive) mounted in a corresponding interface (e.g., a USB port).

Storage device 22 stores program code of control program 23. One or more processing units 21 may execute control program 23 to provide instructions to sequence controller 10 via MR system interface 24. For example, sequence controller 10 may be instructed to initiate a desired pulse sequence of pulse sequences 27. In particular, sequence controller 10 may be instructed to control the switching of magnetic field gradients via amplifiers 8a-8c at appropriate times, the transmission of radio-frequency pulses having a specified phase and amplitude at specified times via RF system 11 and RF amplifier 12, and the readout of the resulting MR signals.

Control program 23 may also be executed to control injector interface 26 as required by various pulse sequences of pulse sequences 27. In response, injector interface 26 controls media injector 19 to inject contrast media into subject 4 as is known in the art. For example, media injector 19 may be controlled to inject a designated amount of media into patient 4 at a designated rate and at a designated time prior to execution of a pulse sequence.

Storage device 22 stores program code of matrix determinator 28 which is executable to determine a pseudoinverse distortion matrix as described herein. Images 29 may be generated conventionally and/or using a pseudoinverse distortion matrix as described herein. Images 29 may be provided to terminal 30 via terminal interface 25 of system 20. Terminal interface 25 may also receive input from terminal 30, which may be used to provide commands to control program 23 in order to control sequence controller 10 and/or other elements of system 1. The commands may include commands to initiate an imaging sequence to acquire image data of a subject and commands to specify an ROI based on an image displayed by terminal 30. Terminal 30 may simply comprise a display device and an input device coupled to system 20. In some embodiments, terminal 30 is a separate computing device such as, but not limited to, a desktop computer, a laptop computer, a tablet computer, and a smartphone.

Each element of system 1 may include other elements which are necessary for the operation thereof, as well as additional elements for providing functions other than those described herein. Storage device 22 may also store data and other program code for providing additional functionality and/or which are necessary for operation of system 20, such as device drivers, operating system files, etc.

Executable program code according to the above description may be stored on a form of non-transitory computer-readable media. Computer-readable media includes volatile and nonvolatile, removable, and non-removable media implemented in any method or technology for storage of information such as program code, data structures, program modules or other data. Computer-readable media includes, but is not limited to, random access memory (RAM), read-only memory (ROM), electrically erasable programmable ROM (EEPROM), flash memory or other memory technology, compact disk ROM (CD-ROM), digital volatile disks (DVD) or other optical storage, magnetic cassettes, magnetic tape, magnetic disk storage or other magnetic storage devices, or any other medium which can be used to store the desired instructions and which may be accessed by a system (e.g., a computer), including by internet or other computer network form of access.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
   a magnet system configured to generate a polarizing magnetic field within at least a portion of a subject;
   a gradient system to apply a gradient magnetic field to the polarizing magnetic field;
   one or more radio frequency coils to apply an excitation field to the subject and to acquire magnetic resonance data from the subject;
   a display; and
   a computing system to execute program code to:
      acquire a field map representing inhomogeneity of the polarizing magnetic field within the subject;
      determine a pixel shift map based on the field map;
      control the gradient system and the plurality of radio frequency coils to acquire k-space data of the subject;
      generate an image of the subject based on the k-space data;
      determine a distortion matrix corresponding to the pixel shift map;
      determine a locally-regularized pseudoinverse distortion matrix based on the distortion matrix;
      correct the image based on the locally-regularized pseudoinverse distortion matrix; and
      display the corrected image on the display.

2. A system according to claim 1, wherein control of the gradient system and the plurality of radio frequency coils to acquire k-space data of the subject comprises execution of an echo planar imaging pulse sequence; and
   acquisition of the field map comprises control of the gradient system and the plurality of radio frequency coils to execute a gradient echo pulse sequence.

3. A system according to claim 1, wherein determination of the locally-regularized pseudoinverse distortion matrix comprises determination of the locally-regularized pseudoinverse distortion matrix based on a local identity matrix, the distortion matrix, and a complex conjugate of the distortion matrix.

4. A system according to claim 3, wherein a diagonal of the local identity matrix includes values of 1 and values of 0, and wherein the values of 1 correspond to columns of the distortion matrix including values larger than a threshold.

5. A system according to claim 1, wherein determination of the pixel shift map comprises rounding one or more pixel shift values of the pixel shift map to a nearest integer, and wherein the distortion matrix is a rank-deficient matrix.

6. A system according to claim 5, wherein determination of the locally-regularized pseudoinverse distortion matrix comprises determination of a Moore-Penrose pseudoinverse of the distortion matrix.

7. A system according to claim 1, wherein a distortion matrix is determined for each phase-encoding line of the image, and wherein a locally-regularized pseudoinverse distortion matrix is determined for each phase-encoding line of the image.

8. A method comprising:

determining a pixel shift map representing inhomogeneity of a main magnetic field of a magnetic resonance scanner within a subject;

operating the magnetic resonance scanner to generate an image of the subject;

determining a portion of the pixel shift map corresponding to a phase-encoding line of the image;

determining a distortion matrix corresponding to the portion of the pixel shift map;

determining a locally-regularized pseudoinverse distortion matrix based on the distortion matrix; and correcting the line of the image based on the locally-regularized pseudoinverse distortion matrix.

9. A method according to claim 8, wherein operating the magnetic resonance scanner to generate an image of the subject comprises executing an echo planar imaging pulse sequence; and wherein determining the pixel shift map comprises operating the magnetic resonance scanner to execute a gradient echo pulse sequence to acquire a field map.

10. A method according to claim 8, wherein determining the locally-regularized pseudoinverse distortion matrix comprises determining the locally-regularized pseudoinverse distortion matrix based on a local identity matrix, the distortion matrix, and a complex conjugate of the distortion matrix.

11. A method according to claim 10, wherein a diagonal of the local identity matrix includes values of 1 and values of 0, and wherein the values of 1 correspond to columns of the distortion matrix including values larger than a threshold.

12. A method according to claim 8, wherein determining the pixel shift map comprises rounding one or more pixel shift values of the pixel shift map to a nearest integer, and wherein the distortion matrix is a rank-deficient matrix.

13. A method according to claim 12, wherein determining the locally-regularized pseudoinverse distortion matrix comprises determining a Moore-Penrose pseudoinverse of the distortion matrix.

14. A method according to claim 8, further comprising:

determining a second portion of the pixel shift map corresponding to a second phase-encoding line of the image;

determining a second distortion matrix corresponding to the second portion of the pixel shift map;

determining a second locally-regularized pseudoinverse distortion matrix based on the second distortion matrix; and correcting the second line of the image based on the second locally-regularized pseudoinverse distortion matrix.

15. A non-transitory medium storing program code executable by one or more processing units to execute the program code to cause a computing system to:

determine a field map representing inhomogeneity of a main magnetic field of a magnetic resonance scanner within a subject;

determine a pixel shift map based on the field map;

operate the magnetic resonance scanner to generate an image of the subject;

determine a portion of the pixel shift map corresponding to a phase-encoding line of the image;

determine a distortion matrix corresponding to the portion of the pixel shift map;

determine a locally-regularized pseudoinverse distortion matrix based on the distortion matrix; and correct the line of the image based on the locally-regularized pseudoinverse distortion matrix.

16. A medium according to claim 15, wherein operation of the magnetic resonance scanner to generate an image of the subject comprises executing an echo planar imaging pulse sequence; and wherein determination of the pixel shift map comprises operating the magnetic resonance scanner to execute a gradient echo pulse sequence to acquire a field map.

17. A medium according to claim 15, wherein determination of the locally-regularized pseudoinverse distortion matrix comprises determination of the locally-regularized pseudoinverse distortion matrix based on a local identity matrix, the distortion matrix, and a complex conjugate of the distortion matrix.

18. A medium according to claim 15, wherein determination of the pixel shift map comprises rounding of one or more pixel shift values of the pixel shift map to a nearest integer, and wherein the distortion matrix is a rank-deficient matrix.

19. A medium according to claim 18, wherein determination of the locally-regularized pseudoinverse distortion matrix comprises determining a Moore-Penrose pseudoinverse of the distortion matrix.

20. A medium according to claim 15, the program code to cause a computing system to:

determine a second portion of the pixel shift map corresponding to a second phase-encoding line of the image;

determine a second distortion matrix corresponding to the second portion of the pixel shift map;

determine a second locally-regularized pseudoinverse distortion matrix based on the second distortion matrix; and correct the second line of the image based on the second locally-regularized pseudoinverse distortion matrix.

* * * * *